(No Model.)
W. T. BLOCK.
PROCESS OF WELDING BESSEMER STEEL.
No. 258,358. Patented May 23, 1882.
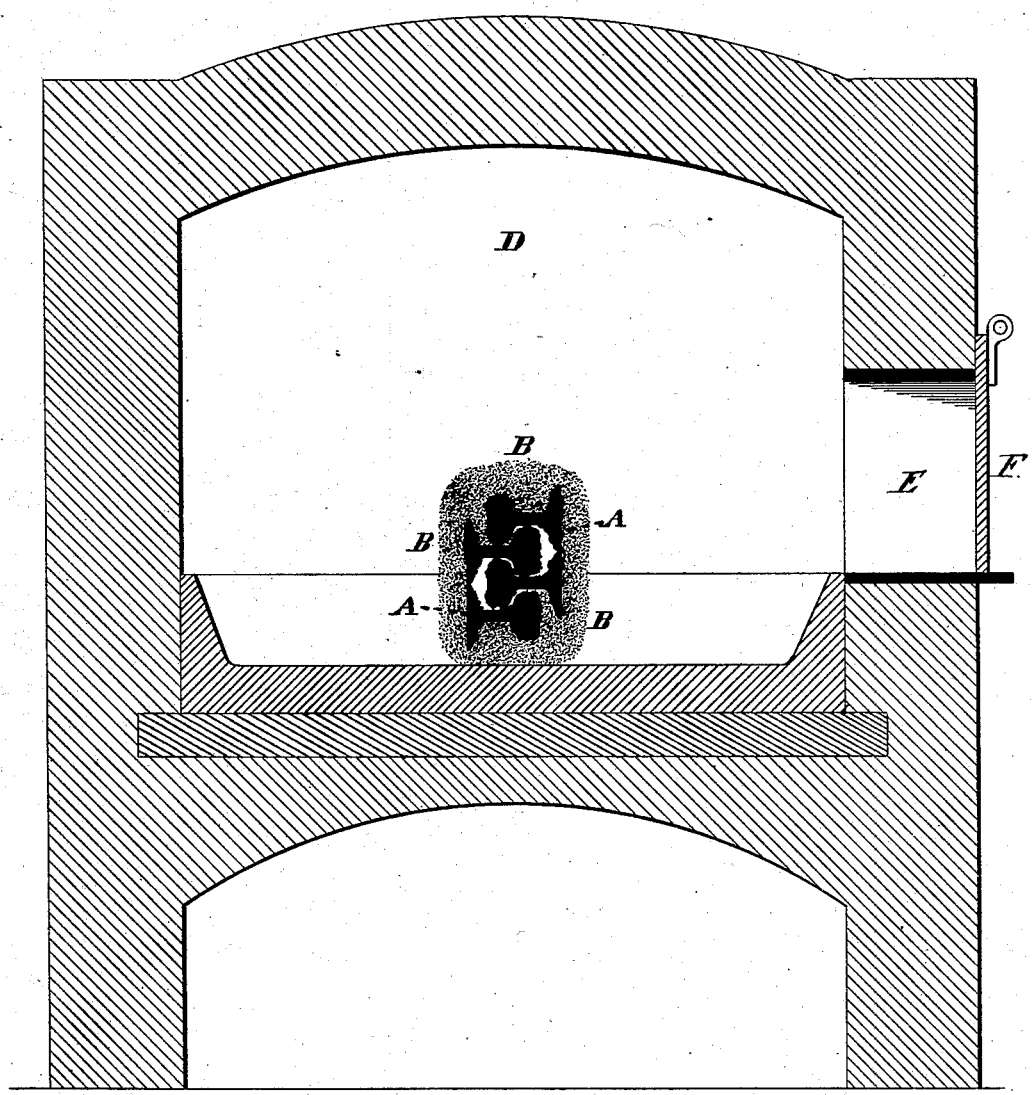
Attest:
Charles Pickles
Geo. H. Knight.
Inventor:
Williard T. Block
By Knight Bros.
Attys.

UNITED STATES PATENT OFFICE.

WILLIARD T. BLOCK, OF HANNIBAL, MISSOURI.

PROCESS OF WELDING BESSEMER STEEL.

SPECIFICATION forming part of Letters Patent No. 258,358, dated May 23, 1882.

Application filed September 13, 1881. (No model.)

*To all whom it may concern:*

Be it known that I, WILLIARD T. BLOCK, of Hannibal, in the county of St. Joseph and State of Missouri, have invented a certain new and useful Improvement in the Art of Welding together Bars of Bessemer Steel, of which the following is a full, clear, and exact description, reference being had to the accompanying drawing, forming part of this specification.

This invention relates to an improvement on the invention described in Letters Patent No. 221,038, granted October 28, 1879, to Thos. J. Deakin, the inventor, and myself, Williard T. Block; and it consists in substituting for the iron turnings in that patent described the use of a certain magnetic iron ore, which is separated from the sand of the ocean by a process patented by T. A. Edison, June 1, 1880. The cost of iron turnings is considerable, and much difficulty has been experienced in getting sufficient quantity of it. Now, I have discovered that this magnetic ore answers every purpose of the iron turnings, and as it is cheap and can be had in any quantity it adds greatly to the value of the invention of T. J. Deakin, aforesaid.

Referring to the accompanying drawing, which is a cross-section through a furnace, A is a pile of Bessemer-steel bars, pieces of railroad-rails being shown surrounded by a coating of the magnetic ore B and resting on the bottom of the furnace D.

As the art of welding together bars of Bessemer steel under this process is fully described in the patent mentioned, it will be unnecessary to describe said process further in this application, as the present invention merely consists in the substituting of the magnetic iron ore for the iron turnings, the heating and welding process and the manner of applying the coating to the pile being the same in each case.

E is the puddling-hole of the furnace, and F the door thereto.

I claim as my invention—

The described process of welding together bars of Bessemer steel, wherein the said magnetic iron ore is used as a coating in place of the iron turnings heretofore used.

WILLIARD T. BLOCK.

Witnesses:
A. H. MACKINTOSH,
A. E. WAGNER.